(12) United States Patent
Khan et al.

(10) Patent No.: US 9,055,840 B2
(45) Date of Patent: Jun. 16, 2015

(54) APPARATUS FOR AND METHOD OF HEATING AN OPERATING FLUID

(75) Inventors: Ahmed Nadim Khan, Staffordshire (GB); Keith Robert Johnson, Leamington Spa (GB); Nico Vandecasteele, Veurne (BE)

(73) Assignee: FRITO-LAY TRADING COMPANY GMBH, Berne (CH)

( * ) Notice: Subject to any disclaimer, the term of this patent is extended or adjusted under 35 U.S.C. 154(b) by 0 days.

(21) Appl. No.: 13/877,982

(22) PCT Filed: Oct. 6, 2011

(86) PCT No.: PCT/EP2011/067432
§ 371 (c)(1),
(2), (4) Date: Jun. 6, 2013

(87) PCT Pub. No.: WO2012/045799
PCT Pub. Date: Apr. 12, 2012

(65) Prior Publication Data
US 2013/0273223 A1    Oct. 17, 2013

(30) Foreign Application Priority Data

Oct. 6, 2010   (GB) .................................. 1016822.7
Nov. 10, 2010  (GB) .................................. 1019000.7

(51) Int. Cl.
*A47J 36/20*   (2006.01)
*A47J 37/12*   (2006.01)
(Continued)

(52) U.S. Cl.
CPC .............. *A47J 37/1276* (2013.01); *A47J 36/38* (2013.01); *A47J 37/1233* (2013.01); *A23L 1/217* (2013.01)

(58) Field of Classification Search
USPC .............................................. 99/403; 426/638
See application file for complete search history.

(56) References Cited

U.S. PATENT DOCUMENTS 4,602,612 A   7/1986   Schwizer
4,941,400 A   7/1990   Moore
(Continued)

FOREIGN PATENT DOCUMENTS

DE   3031425 A1   4/1982
EP   0083429 A1   7/1983
(Continued)

OTHER PUBLICATIONS

UK Search Report mailed Mar. 1, 2011 for Application No. GB1019000.7 (7 pages).

*Primary Examiner* — Dana Ross
*Assistant Examiner* — Renee L Miller
(74) *Attorney, Agent, or Firm* — Colin P. Cahoon; Shaukat A. Karjeker; Carstens & Cahoon, LLP

(57) ABSTRACT

An apparatus for heating an operating fluid, the apparatus comprising a closed circuit for a working fluid, the closed circuit having first and second heat exchangers and a compressor therebetween, the first heat exchanger having a heat input side for connection to an external fluid heat source and a heat output side for vaporizing working fluid within the closed circuit, the compressor being a vapor compressor adapted to compress the vaporized gaseous working fluid from the first heat exchanger to form a higher pressure gaseous working fluid, and the second heat exchanger having a heat input side for receiving and condensing the higher pressure gaseous working fluid from the compressor and a heat output side for heating an external operating fluid. A corresponding method is also disclosed.

9 Claims, 1 Drawing Sheet

(51) Int. Cl.
*A47J 36/38* (2006.01)
*A23L 1/217* (2006.01)

(56) References Cited

U.S. PATENT DOCUMENTS

| | | |
|---|---|---|
| 5,398,668 A | 3/1995 | Daneshvar |
| 5,454,296 A | 10/1995 | Beardsley |
| 6,235,210 B1 | 5/2001 | Saksena |
| 8,683,916 B2 * | 4/2014 | Khan et al. .................. 99/403 |

2010/0000419 A1  1/2010  Payen et al.

FOREIGN PATENT DOCUMENTS

| | | |
|---|---|---|
| EP | 0426516 A1 | 5/1991 |
| EP | 1882888 A1 | 1/2008 |
| GB | 1202268 A | 8/1970 |
| GB | 1488492 A | 10/1977 |
| JP | 03268718 A | 11/1991 |
| JP | 2009165641 A | 7/2009 |
| WO | 9804174 A1 | 2/1998 |

* cited by examiner

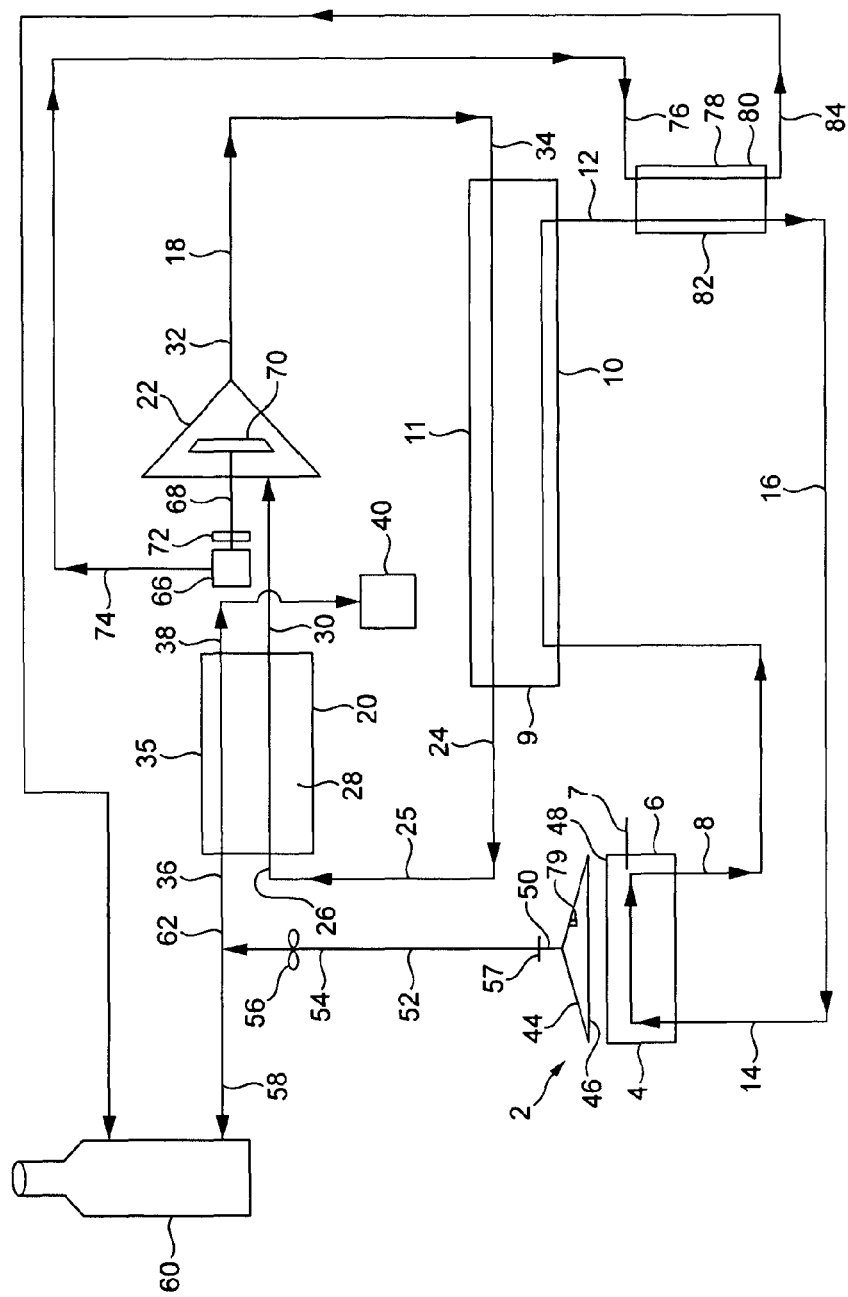

APPARATUS FOR AND METHOD OF HEATING AN OPERATING FLUID

CROSS-REFERENCE TO RELATED APPLICATIONS

This application is a 371 National Stage Application claiming priority to PCT Application No. PCT/EP2011/067432 filed Oct. 6, 2011, which claims priority to Great Britain Application No. 1016822.7 filed Oct. 6, 2010, now GB Patent 2484317 issued Mar. 20, 2013, and Great Britain Application No. 1019000.7 filed Nov. 10, 2010, now GB Patent 2484354 issued Feb. 6, 2013, the technical disclosures of which are hereby incorporated by reference.

BACKGROUND OF THE INVENTION

1. Technical Field

The present invention relates to an apparatus for and method of heating an operating fluid, and has particular application in a frying method and a frying apparatus which have high energy efficiency, and low waste heat.

2. Description of Related Art

The present invention has particular application in the manufacture of snack foods, more particularly potato chips.

In many industrial processes there is a need to heat an operating fluid, and there is a general desire to provide energy efficient processes, having minimum carbon footprint, to achieve that heating. For example, frying processes are commonly used to produce a variety of different fried foodstuffs. Frying is particularly used to cook snack food products such as potato chips. In potato chip manufacture, cut slices of raw potato are cooked in a fryer containing cooking oil at an elevated temperature. Energy is required to heat the oil and maintain it at the desired cooking temperature. In addition, the frying process dehydrates the potato slices and a large volume of steam is generated which is typically captured by a hood disposed over the fryer and exhausted to the atmosphere, or the steam is passed into a thermal oxidiser for volatile destruction.

There is a generally recognised desire in the snack food manufacturing art to reduce the energy costs and waste heat generation of the frying apparatus. However, it is also necessary to ensure that the frying process and apparatus still produce a high quality product to the consumer which meets customer acceptance and is reliably and consistently achievable despite high production volumes. In particular, potato chips are normally required to meet very strict customer acceptance criteria for the respective product, for example having specific moisture and oil-in-chip contents, and the desired taste, organoleptic and other sensory attributes.

SUMMARY OF THE INVENTION

The present invention aims to provide an apparatus for and method of heating an operating fluid, which may have particular application in a frying method and a frying apparatus, which have high energy efficiency and low generation of waste heat. Such an apparatus and method have particular application for frying foodstuffs, such as snack foods and most particularly potato chips, to provide enhanced energy efficiency and reduced waste heat, in particular reduced waste steam production.

The present invention accordingly provides an apparatus for heating an operating fluid, the apparatus comprising a closed circuit for a working fluid, the closed circuit having first and second heat exchangers and a compressor therebetween, the first heat exchanger having a heat input side for connection to an external fluid heat source and a heat output side for vaporising working fluid within the closed circuit, the compressor being a vapour compressor adapted to compress the vaporised gaseous working fluid from the first heat exchanger to form a higher pressure gaseous working fluid, and the second heat exchanger having a heat input side for receiving and condensing the higher pressure gaseous working fluid from the compressor and a heat output side for heating an external operating fluid.

Preferably, the apparatus further comprises an oil recirculating system coupled to a fryer for frying foodstuffs, wherein the heat output side of the second heat exchanger is connected to the oil recirculating system, the fryer oil comprising the external operating fluid.

Optionally, the apparatus yet further comprises a hood above the fryer, the heat input side of the first heat exchanger being connected to the hood, the hood being adapted for collecting steam generated during the frying process, the steam comprising the external fluid heat source.

Typically, the fryer has inlet and outlet ends connected to the oil recirculating system.

The apparatus may further comprise a gas-powered engine for driving the compressor.

The apparatus may yet further comprise a third heat exchanger for heating the external operating fluid, the gas-powered engine having an exhaust for combustion gases connected to the third heat exchanger.

Optionally, the apparatus further comprises an electrical generator connected to the gas-powered engine to generate electrical power to drive the compressor.

Typically, the gas-powered engine is a gas turbine.

The apparatus may further comprise a tank for collecting from the first heat exchanger condensed fluid of the external fluid heat source.

The present invention also provides a method of heating an operating fluid, the method comprising the steps of:
i. vaporising a working fluid in one side of a first heat exchanger of a closed circuit by heat input from an external fluid heat source in an opposite side of the first heat exchanger;
ii. conveying the vaporised gaseous working fluid around the closed circuit to a vapour compressor;
iii. compressing the vaporised gaseous working fluid in the vapour compressor to form a higher pressure gaseous working fluid;
iv. conveying the higher pressure gaseous working fluid around the closed circuit to a second heat exchanger of the closed circuit;
v. condensing the higher pressure gaseous working fluid in one side of the second heat exchanger, thereby heating an external operating fluid on an opposite side of the second heat exchanger; and
vi. conveying the condensed working fluid around the closed circuit to the first heat exchanger.

The method is preferably used in a method of frying foodstuffs in a fryer which employs recirculated fryer oil from the fryer as the external operating fluid. The external fluid heat source may comprise steam generated during the frying process. Typically, the fryer has inlet and outlet ends coupled to an oil recirculating system. The foodstuffs may comprise snack foods, optionally potato chips.

Preferably, the vapour compressor is driven by a gas-powered engine.

Optionally, the gas-powered engine has an exhaust for combustion gases and the exhaust is connected to a third heat exchanger for heating the external operating fluid.

The gas-powered engine may be connected to an electrical generator for generating electrical power to drive the compressor. The gas-powered engine may be a gas turbine.

The method may further include the step of collecting condensed fluid of the external fluid heat source from the first heat exchanger.

BRIEF DESCRIPTION OF THE DRAWINGS

An embodiment of the present invention will now be described, by way of example only, with reference to the accompanying drawings, in which:

FIG. 1 is a schematic illustration of a frying apparatus incorporating an apparatus for heating an operating fluid in accordance with an embodiment of the present invention.

DETAILED DESCRIPTION OF THE INVENTION

Referring to FIG. 1, there is shown a frying apparatus incorporating an apparatus for heating an operating fluid in accordance with a first embodiment of the present invention. A fryer 2 is a continuous fryer in which foodstuffs, typically snack foods such as potato chips, to be fried are fed in at one upstream longitudinal end 4 of the fryer 2 and the cooked foodstuff is removed at the opposite downstream longitudinal end 6 of the fryer 2. Correspondingly, the cooking oil flows continuously along the fryer 2 from the upstream or inlet end 4 to the downstream or outlet end 6. A conveyor 7 for removing fried foodstuffs from the oil in the fryer 2 is disposed at the outlet end 6.

Oil at a relatively high input temperature, typically from 175 to 182° C. is fed in at or adjacent to the upstream end 4 and oil at a relatively low temperature of from 150 to 155° C. is continuously removed from the fryer 2 at the downstream end 6. An outlet 8 at the downstream end 6 connects to a first side 9 of a first heat exchanger 10 which heats the oil. An output line 12 from the first side 9 of the first heat exchanger 10 connects to an inlet 14 at the upstream end 4 of the fryer 2. This provides a first closed circuit 16 for recirculating the oil for the fryer 2, the recirculated oil being heated by the first heat exchanger 10.

On a second side 11 of the first heat exchanger 10 is a second closed circuit 18 for a working fluid. The working fluid undergoes phase changes between a liquid and a gas, and vice versa, within the second closed circuit 18. Typically, the working fluid may comprise water, a refrigerant, such as an organic refrigerant, or any other suitable working fluid having a boiling point in the desired temperature range as described hereinafter. For example, the working fluid may be carbon dioxide. Typically, the boiling point is less than 125° C., which is a typical input temperature for the steam entering the first heat exchanger 10 for vaporising the working fluid.

In the second closed circuit 18, there is provided a second heat exchanger 20 and a compressor 22, typically a mechanical vapour compressor 22. At an output 24 of the second side 11 of the first heat exchanger 10, liquid working fluid exits and is fed along a conduit 25 to an input 26 of a first side 28 of the second heat exchanger 20. The working fluid in liquid form passes through the first side 28 of the second heat exchanger 20 where it is vaporised and an output 30 feeds the vaporised working fluid to the compressor 22. The compressor 22 compresses the vapour to an elevated temperature and pressure. The working fluid in vapour form at elevated pressure and temperature is then fed along an output conduit 32 from the compressor 22 to an input 34 of the second side 11 of the first heat exchanger 10.

On a second side 35 of the second heat exchanger 20 is at least one input 36 for a fluid heat source, in the form of steam, and an output 38 for condensate, in the form of water. The fluid heat source undergoes a phase change, from a gas to a liquid, within the second side 35 of the second heat exchanger 20 and the resultant latent heat given up is employed, together with the heat transfer resulting from the elevated input temperature of the fluid heat source, to vaporise the working fluid which passes through the first side 28 of the second heat exchanger 20. The condensed working fluid on output 38 is received in a condensate collection tank 40.

As described hereinafter, the steam comes from the fryer vapours and the recovered water condensate from the fryer vapours is collected in the collection tank 40 which can then form a supply of water to be used elsewhere within the manufacturing plant or in the production process, for example for washing potatoes used to form the potato chips to offset or reduce fresh water consumption at the factory. The recovered water may be further cooled to ambient temperature using commercially available cooling equipment.

A hood 44 is disposed above the fryer 4 to capture steam which is generated by the dehydration of the foodstuff, typically potato slices, during the frying process. The lower periphery 46 of the fryer hood 44 covers substantially all of the upper periphery 48 of the fryer 4 so that substantially all of the steam is captured within the fryer hood 44 as it rises from the fryer oil during the frying process. The hood 44 extends at least partially over the conveyor 7, so that the fried foodstuff product on the conveyor 7 is exposed to the atmosphere within the hood 44 after removal from the oil.

The fryer hood 44 has an exit 50 connected to a conduit 52. The conduit 52 in turn is connected to the input 36 on the second side 35 of the second heat exchanger 20. The conduit 52 is substantially vertically oriented to form a vertically oriented fryer hood exhaust stack 54. A fan 56, driven for example by an electric motor (not shown), may be disposed within the conduit 52 to exhaust steam upwardly from the hood 44. A sensor 79, which may be a pressure sensor or an oxygen sensor, may be provided in the fryer hood 44 or the stack 54 to provide feed forward control of the fan 56. A particulate filter 57 is located within the conduit 52 above the hood 44.

At the top of the exhaust stack 54 a first conduit branch 58 connects to a chimney 60 for exhausting a portion of the steam to atmosphere. Alternatively, the steam may be condensed and cooled to ambient temperature using commercially available cooling equipment. The water collected may be directed to the collection tank 40. A second conduit branch 62 connects to the input 36. Valves (not shown) may be provided within the first conduit branch 58 and second conduit branch 62 for selectively opening or closing the respective branch 58, 62.

Accordingly, steam from the frying process is fed, as a gaseous heat source, to the second heat exchanger 20. The steam condenses within the second heat exchanger 20 to form a liquid condensate on output 38 which is collected in the tank 40. Steam accordingly gives up thermal energy which vaporises the working fluid on the other side of the second heat exchanger 20. The vaporised working fluid is delivered to the compressor 22 which compresses the gaseous working fluid to an even higher temperature and pressure. Such high temperature and pressure working fluid is then fed to the input 34 of the second side 11 of the first heat exchanger 10 which then transfers a large amount of energy to the fryer oil passing through the first side 9 of the first heat exchanger 10. Typically, the fryer oil is fed from the fryer 2 to the first heat exchanger 10 at an input temperature of about 150 to 155° C.

and exits the first heat exchanger 10 at a temperature of about 165 to 180° C. In the second side 11 of the first heat exchanger 10 the working fluid condenses, and the liquid is then conveyed to the second heat exchanger 20 where it is vaporised and the cycle is repeated.

An engine 66 is powered by burning a combustible gas, such as natural gas. Typically, the engine 66 is a gas turbine engine. An electrical generator 72, for generating an alternating current electrical power output, is connected to the output shaft 68 of the gas engine 66 to generate electricity. The electricity is used to drive the compressor 22. The compressor 22 carries one or more rotatable compressor discs 70 for compressing the steam flow within the compressor 22.

In the embodiment, the output electrical power of the electrical generator 72 driven by the gas engine 66 is greater than the electrical power required to drive the compressor 22. The surplus electrical power output is for use on site or in the factory.

The gas engine 66 has an exhaust 74 for combustion products which is connected as an input 76 to a second side 78 of a third heat exchanger 80, oil within the first closed circuit 16 for recirculating the oil for the fryer 2 being passed through a first side 82 of the third heat exchanger 80. An output 84 of the second side 78 of the third heat exchanger 80 connects to the chimney 60 for exhausting the combustion products from the gas engine to atmosphere. The exhaust provides additional heat for heating the fryer oil in the first closed circuit 16.

Therefore the gas engine 66 is employed not only to provide electrical power to drive the vapour compressor 22, and optionally to generate surplus electrical power for use on site, but also to provide a high grade energy source to supplement the final proportion of energy required for oil heating, by using the exhaust gas to give up waste heat from the gas engine 66 to the oil.

The exhaust 54 feeds exhaust gas from the gas engine 66 at a typical temperature of about 300 to 500° C. and the output 78 conveys gas at a typical temperature of about 230° C. to the chimney 40.

This provide a highly energy efficient heating system for the fryer oil which also recovers waste steam to produce useful condensate, and optionally generates electricity.

Typically, the steam exiting the fryer hood 44 upwardly along the conduit 52 and entering the input 56 of the second heat exchanger 20 is at a temperature of from 100 to 150° C., typically about 125° C., and at a pressure at or less than atmospheric pressure.

In the compressor 22 the gaseous working fluid is compressed to an elevated pressure to form a high pressure gas at an elevated temperature. For example, the compressed liquid working fluid exiting the compressor 22, and therefore fed as a working fluid to the first heat exchanger 10, is at a temperature of from 190 to 220° C., typically about 190° C., and at a pressure of from $10 \times 10^5$ Pa absolute to $15 \times 10^5$ Pa absolute.

In the second side 11 of the first heat exchanger 10, the high pressure gaseous working fluid is condensed to form a liquid, thereby releasing latent heat which is transferred to the oil on the opposite side of the first heat exchanger 10, thereby heating the oil. Such high temperature and high pressure gaseous working fluid therefore transfers a large amount of thermal energy in the first heat exchanger 10 from the working fluid to the oil on the first side 9 of the first heat exchanger 10. The cooled liquid working fluid is output from the first heat exchanger 10 and conveyed to the second heat exchanger 20 where the working fluid is vaporised by the input heat from the steam. The cycle is completed by feeding the vaporised fluid to the compressor 22 which forms the high pressure gas which is then conveyed for liquefaction in the first heat exchanger 10.

Compared to a conventional industrial scale commercial potato chip fryer, the frying method and apparatus of the present invention can yield significant energy and cost savings.

For example, a conventional fryer uses a gas-powered heater to heat the oil exiting the outlet end of the fryer tank and the heated oil is recycled back to the inlet end of the fryer tank. The oil is typically heated from a temperature of about 155° C. to a temperature of 185-190° C. The steam is typically either exhausted to the atmosphere or fed into a thermal oxidiser for destruction of volatile material within the fryer vapours and then exhausted to the atmosphere.

The recovery of steam in accordance with the preferred embodiment not only provides a water source but recovers significant amounts of energy from the steam, both the thermal energy and the latent heat, which are used to heat a working fluid in a second heat exchanger of a closed circuit for the working fluid, which working fluid in turn is used to heat the oil in the first heat exchanger after conversion of the working fluid into a high pressure/high temperature working fluid by the compressor. The compressor is driven by an engine driven by a combustible gas and the exhaust energy is at least partly employed to heat the oil in the third heat exchanger.

The use of the frying method and apparatus of the present invention can achieve fuel savings of approximately 50% or greater as compared to the conventional fryer. In addition, water is recovered which reduces water costs elsewhere in the facility.

Although the present invention has been described with reference to a fryer apparatus, it would be apparent to the skilled person that the apparatus for heating an operating fluid, using a closed circuit, may be employed in a variety of other industrial apparatus and processes where waste heat is employed to provide energy to a fluid using a closed circuit incorporating the phase change of a working fluid, with a vapour compressor being employed to compress a vapour to provide a high grade heat source for heating the operating fluid.

Other modifications to the present invention will be apparent to those skilled in the art and are encompassed within the scope of the present invention.

The invention claimed is:

1. An apparatus for heating an external operating fluid, the apparatus comprising:
   a closed circuit for a working fluid, the closed circuit having:
      first and second heat exchangers, the first heat exchanger having a heat input side for connection to an external fluid heat source and a heat output side for vaporizing working fluid within the closed circuit; and
      a compressor adapted to compress the vaporized gaseous working fluid from the first heat exchanger to a higher pressure gaseous working fluid;
      wherein the second heat exchanger has a heat input side for receiving and condensing the higher pressure gaseous working fluid from the compressor and a heat output side for heating an external operating fluid.

2. The apparatus according to claim 1 further comprising an oil recirculating system coupled to a fryer for frying foodstuffs, wherein the heat output side of the second heat exchanger is connected to the oil recirculating system, the fryer oil comprising the external operating fluid.

3. The apparatus according to claim 2 further comprising a hood above the fryer, the heat input side of the first heat exchanger being connected to the hood, the hood being adapted for collecting steam generated during the frying process, the steam comprising the external fluid heat source.

4. The apparatus according to claim 3 wherein the fryer has inlet and outlet ends connected to the oil recirculating system.

5. The apparatus according to claim 1 further comprising a gas-powered engine for driving the compressor.

6. The apparatus according to claim 5 further comprising a third heat exchanger for heating the external operating fluid, the gas-powered engine having an exhaust for combustion gases connected to the third heat exchanger.

7. The apparatus according to claim 5 further comprising an electrical generator connected to the gas-powered engine to generate electrical power to drive the compressor.

8. The apparatus according to claim 5 wherein the gas-powered engine is a gas turbine.

9. The apparatus according to claim 1 further comprising a tank for collecting from the first heat exchanger condensed fluid of the external fluid heat source.

\* \* \* \* \*